(12) United States Patent
Fitzgerald et al.

(10) Patent No.: US 7,979,237 B2
(45) Date of Patent: Jul. 12, 2011

(54) FRACTURE PREDICTION FOR CRYSTALLINE MICROSTRUCTURES

(75) Inventors: Alissa M. Fitzgerald, Menlo Park, CA (US); David M. Pierce, Afton, MN (US)

(73) Assignee: A. M. Fitzgerald & Associates, LLC, Burlingame, CA (US)

( * ) Notice: Subject to any disclaimer, the term of this patent is extended or adjusted under 35 U.S.C. 154(b) by 695 days.

(21) Appl. No.: 12/116,420

(22) Filed: May 7, 2008

(65) Prior Publication Data

US 2009/0281768 A1  Nov. 12, 2009

(51) Int. Cl.
G06F 17/18 (2006.01)
(52) U.S. Cl. .................................................. 702/181
(58) Field of Classification Search .............. 702/35, 702/181, 182
See application file for complete search history.

(56) References Cited

U.S. PATENT DOCUMENTS 6,567,715 B1 * 5/2003 Sinclair et al. ............... 700/110
6,817,255 B2 * 11/2004 Haque et al. ............. 73/862.638
7,272,801 B1 * 9/2007 Kamon et al. ................ 716/102

OTHER PUBLICATIONS

P. T. Jones et al., Statistical characterization of fracture of brittle MEMS materials, SPIE Conf. on MEMS Reliability, SPIE vol. 3880, Sep. 1999, p. 20-29.
S. F. Duffy et al., Noninteractive macroscopic reliability model for ceramic matrix composites with orthotropic material symmetry, ASME J. Engineering for Gas Turbines and Power, vol. 112, Oct. 1990, p. 507-511.
W. N. Sharpe, et al., Fracture strength of silicon carbide microspecimens, IEEE J. Microelectromechanical Systems, vol. 14, Oct. 2005, p. 903-913.
K-S. Chen, et al., Controlling and testing the fracture strength of silicon on the mesoscale, J. Am. Ceram. Soc., vol. 83, Jun. 2000, p. 1476-1484.
ASTM, Standard Test Method for Flexural properties of unreinforced and reinforced plastics and electrical insulating materials by four-point bending, ASTM D 6272-02, Jun. 2002, p. 1-9.
Connecticut Reserve Technologies, Inc., CARES Theory Guide, Sep. 2007, p. 1-23.
R. Boroch et al., Characterization of strength properties of thin polycrystalline silicon films for MEMS applications, Fatigue Fract Engng Mater Struct, vol. 30, Jan. 2007, p. 2-12.
J. Bagdahn et al., Fracture strength of polysilicon at stress concentrations, IEEE J. Microelectromechanical Systems, vol. 12, Jun. 2003, p. 302-312.

* cited by examiner

Primary Examiner — Drew A Dunn
Assistant Examiner — Stephen Cherry
(74) Attorney, Agent, or Firm — NUPAT, LLC; Morrison Ulman

(57) ABSTRACT

A method for predicting failures in crystalline microstructures is described. Fracture stress distribution data obtained from test samples prepared according to the same manufacturing process as a contemplated device is used to characterize the strength of surfaces in a numerical stress analysis of the device. The reliability is then calculated for surface nodes on the device. The product of all such reliabilities yields the overall reliability (or 1—the overall failure probability) of the device.

20 Claims, 12 Drawing Sheets

FRACTURE PREDICTION FOR CRYSTALLINE MICROSTRUCTURES

TECHNICAL FIELD

The disclosure is generally related to systems and methods for predicting fractures in crystalline microstructures.

BACKGROUND

Crystalline microstructures include micro-electromechanical systems (MEMS), monolithic integrated electronic and optoelectronic devices (e.g. optical ridge waveguides), solar cells, and other structures that are made from crystalline materials and are small in at least one dimension (e.g. thickness). Throughout the specification, MEMS are used as examples of crystalline microstructures and the definition of "MEMS" is expanded to include structures that do not necessarily include moving parts or electrical actuators, but that are made from crystalline bulk materials. Further, a crystalline microstructure or MEMS device (according to the expanded definition of "MEMS") has at least one "small" dimension that accentuates the importance of surface properties in determining the structural characteristics of the device. For example, a solar cell may be many centimeters in length and width, but less than a millimeter in thickness. The small ratio of thickness to length and width means that surface properties of the solar cell are important determinants of its mechanical strength, and therefore that it is considered to be a "microstructure". The most common crystalline microstructures, however, are MEMS devices in the traditional sense of that term.

Micro-electromechanical systems (MEMS) are mechanical devices roughly ranging in size from micrometers to millimeters, although the term "MEMS" is generalized somewhat in the specification. A subset of MEMS, albeit the majority of MEMS, is silicon MEMS, meaning devices that are fabricated from silicon wafers. Examples of silicon MEMS devices include accelerometers used to trigger airbag deployment in cars, and chips containing millions of microscopic mirrors that modulate light in projection displays.

Silicon MEMS began with the realization that silicon can be used as a mechanical material rather than (or in addition to) as an electronic material. The growth of silicon MEMS technology has been aided by the availability of silicon processing tools originally developed for the semiconductor integrated circuit industry. More recently, tools such as deep reactive ion etchers have been built specifically for MEMS fabrication.

Silicon wafers, the starting point for silicon MEMS device fabrication, are essentially perfect crystals in their bulk, but may have varying surface properties. A polished silicon surface has different properties than an etched surface, for example. In particular, different surfaces are characterized by different imperfections or deviations from the perfect bulk crystalline lattice. The surface properties of micro-scale devices are especially critical to performance because the surface to volume ratio is greater for small devices than for large ones.

Silicon and other crystalline materials are brittle. They can be stressed repeatedly to less than their breaking point with no ill effects. But once a silicon structure breaks, it is permanently destroyed. (In the specification "fracture" and "failure" are used interchangeably.) Structures made from brittle materials fail catastrophically when applied stress exceeds the strength of the weakest part of the structure. In silicon MEMS the maximum stress often occurs on a surface rather than in the bulk material and the weakest link is most often a surface flaw.

Currently, the reliability of silicon MEMS devices can be estimated from the results of destructive testing of finished devices. Simply put, one makes devices and then breaks them. This approach is inefficient because it leaves engineers without reliability data until late in the development cycle when a device has been fully designed and built. Furthermore, if problems are discovered during reliability testing, there is no assurance that whatever changes are made will have the desired effect. One must repeat the design-build-break cycle to see if modifications are successful. The duration and expense of this mode of development leads to designs that may be unnecessarily bulky as engineers try to avoid the risk of having to run extra development cycles.

What is needed is a method to predict failures in crystalline microstructures. Ideally, such a method would be sensitive to varying surface properties of crystalline materials, and offer predictive data before complex devices are fabricated.

BRIEF DESCRIPTION OF THE DRAWINGS

The drawings are heuristic for clarity.

DETAILED DESCRIPTION

Figure 1:
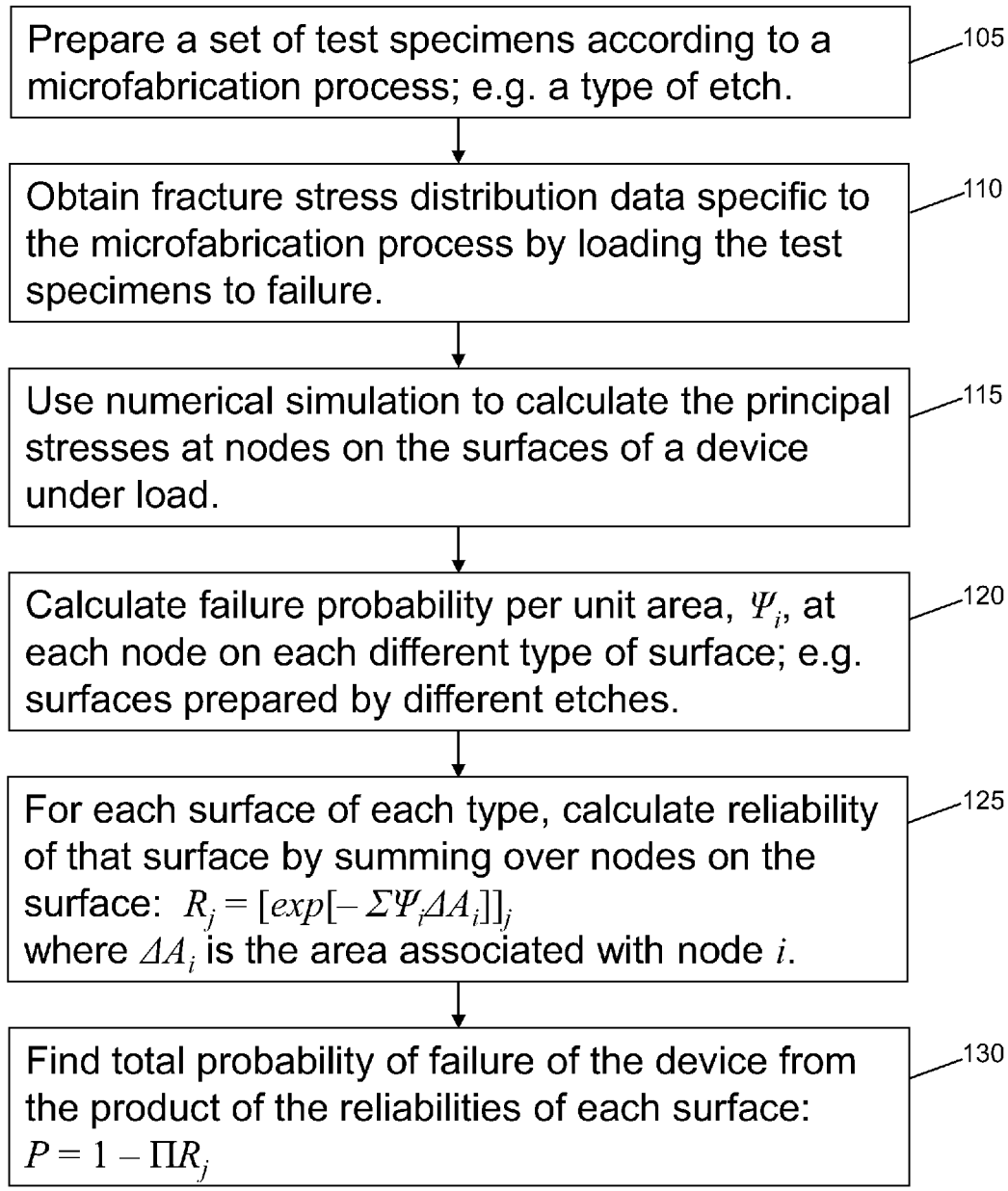
FIG. 1 shows a flow chart outlining a method for predicting fractures in crystalline microstructures.

A method for predicting the failure of crystalline microstructures is described. Using the method, one may predict the probability of failure of a structure as a function of applied load. For example, using the method, one might discover that a certain MEMS device has a 50% probability of failure when it is loaded by a five Newton force applied in a particular direction to a specific part of the device. Predictions may be obtained for different device designs or different loads without having to build an actual device.

The method described herein depends on the fabrication and destructive testing of test samples that are prepared according to the same manufacturing processes (e.g. etches, depositions, anneals, oxidation, epitaxy) as those that are contemplated for building an actual device. The test samples are very simple compared to typical MEMS devices, and are therefore inexpensive and quick to build. Furthermore, the test samples are used to characterize manufacturing processes, not particular devices, so data obtained from test samples is valid for a wide range of device designs made according to a particular process flow.

Once manufacturing processes have been characterized, that information is combined with the results of a numerical simulation to predict failures in devices. An assumption underlying the method described herein is that the bulk material (e.g. a silicon wafer) from which a device is made is an essentially perfect crystal. In other words, all defects that affect device reliability are assumed to be surface defects. Therefore, the failure prediction method takes into particular account differences in surface properties caused by different manufacturing processes. For example, an etched surface is treated differently than a polished surface.

Surfaces prepared by various manufacturing processes, such as etching, polishing, deposition, thermal annealing, etc., can be characterized in terms of statistical distributions. Just as test scores for students in a class can be represented by a bell curve, the fracture strengths of a set of test surfaces can be represented by a statistical function known as a Weibull distribution. A statistical distribution function is used to characterize a manufacturing process applied to a silicon surface because, even in ideal circumstances, the exact shapes and sizes of flaws left on the surface by the manufacturing process differ among identically prepared test surfaces. The Weibull distribution is appropriate for "weakest link" phenomena such as the failure of brittle materials.

Test samples are designed to isolate the effect of surface flaws on failure probability while normalizing other variables. Often, test samples are made in geometries which lend themselves to closed form analysis of stresses and surface effects. Using results from simple test samples, failure probability may be computed per unit area of stressed surface. The normalized data can then be applied to complex surfaces that have been divided into small pieces corresponding to nodes in a numerical simulation. Numerical simulation replaces closed form analysis for structures that have complicated geometry and different types of surfaces.

FIG. 1 shows a flow chart outlining a method for predicting fractures in crystalline microstructures. Step 105 in the method is preparing a set of test specimens according to a microfabrication process such as an etch process. Step 110 is obtaining fracture stress distribution data specific to the microfabrication process of step 105 by loading the test specimens to failure. Fracture stress data obtained by breaking test specimens, i.e. the stress at which each specimen in a set of specimens broke, may be fit to a Weibull distribution or other statistical distribution. Step 115 is using numerical simulation to calculate the principal stresses at nodes on the surface of a device under load. The flexibility of numerical simulation allows one to test different types of loads and/or different device geometries. A commonly used numerical simulation method is finite element analysis. However, other numerical or computational methods such as finite difference methods, boundary element analysis or spectral element methods may also be used. Furthermore, although the word "node" is commonly associated with finite element analysis, here "node" refers generally to a point in a finite solution space in which a numerical simulation method is applied.

Step 120 is calculating the failure probability per unit area at each node on each different type of surface of a device. Step 125 is calculating the reliability for each (jth) surface of the device by performing a sum over nodes: $R_j = [\exp[-\Sigma \Psi_i \Delta A_i]]_j$ where $\Delta A_i$ is the area associated with node i (no summation over repeated indices). Step 130 is finding the total probability of failure of the device by subtracting from one (1) the product of the reliabilities of each surface: $P = 1 - \Pi R_j$. Each of the steps outlined in FIG. 1 will now be described in more detail.

Figure 2:
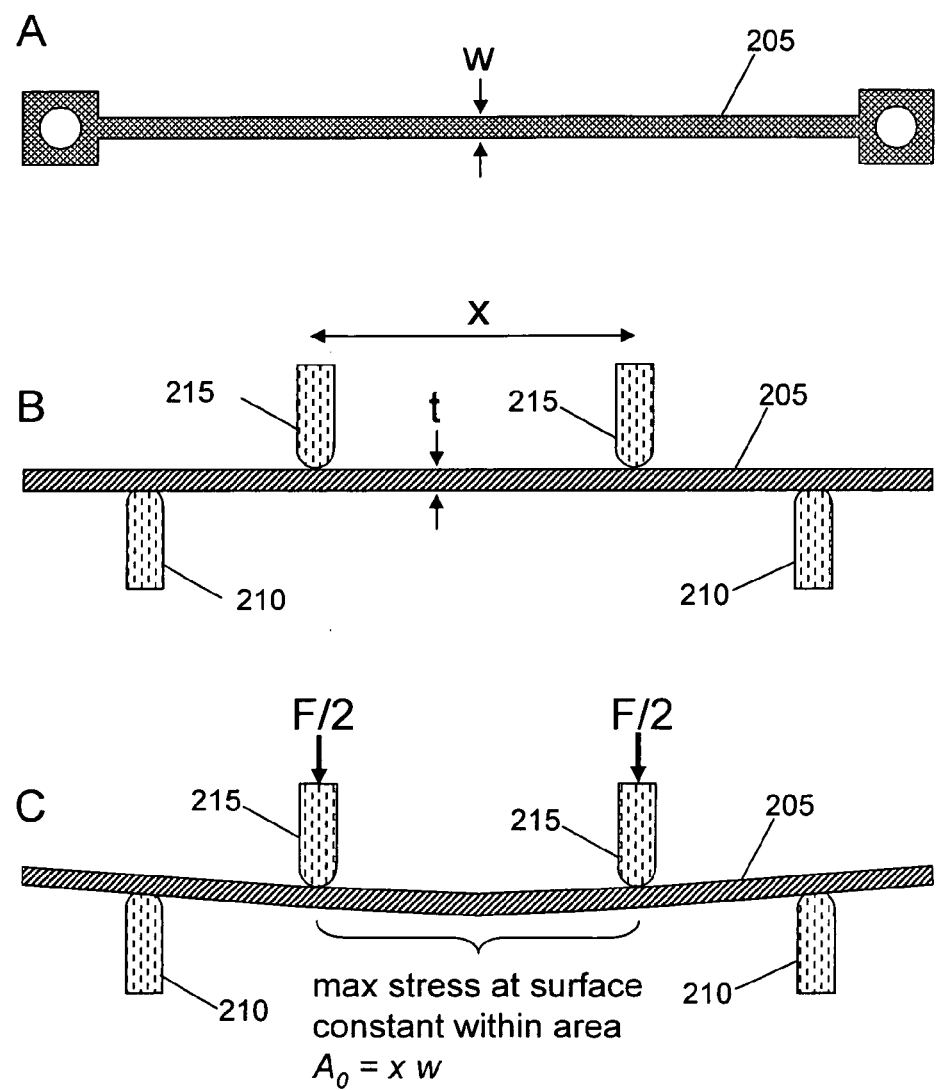
FIG. 2 (A, B, C) shows a test beam.

FIG. 2 (A, B, C) shows a test beam 205. FIG. 2A shows a top view of the test beam while FIGS. 2B and 2C are side views. In FIGS. 2B and 2C test beam 205 is placed in a load fixture. Some details of the load fixture are not shown; however, load points 210 and 215 are illustrated. The distance between inner load points (i.e. points 215 in FIGS. 2B and 2C) was half the distance between the outer load points (i.e. points 210 in FIGS. 2B and 2C). Load points 215 push test beam 205 against load points 210 causing the beam to bend as shown in FIG. 2C. If the force F applied to the beam via load points 215 becomes too great, the beam breaks. In this type of test specimen, the maximum stress develops uniformly on the surface of the beam within the area between load points 215. The fracture stress in this configuration is given by:

$$\sigma_f = 3FL/4wt^2$$

where F is the applied load at fracture, L is the distance between the outer load points, w is the width of the beam, and t is the thickness of the beam. A reference area $A_0$ for the test beam may be defined as the area over which the maximum stress develops. For the beam shown in FIGS. 2A-2C, the reference area $A_0 = x w$ where x is the distance between load points 215. The reference area is used to normalize the test specimen results and permit their application to devices with more complicated geometries. Other test specimen geometries besides the test beam shown in FIGS. 2A-2C may be used. For example, a cantilever test specimen may be used. It may be necessary to use numerical analysis to calculate maximum stresses and reference areas for geometries not tractable in closed form, however.

In an experiment, a set of 50 beams like those shown in FIG. 2 were used to characterize an etched silicon surface and 50 additional beams were used to characterize a polished silicon surface. The test beams were 11.7 mm long, 300 μm wide and 310 μm thick. The distance between inner load points (i.e. points 215 in FIGS. 2B and 2C) was 4 mm; the distance between the outer load points (i.e. points 210 in FIGS. 2B and 2C) was 8 mm. (Clearly, these dimensions are illustrative of one particular experiment only. Test specimens of other sizes and shapes are also suitable.)

Each of the 100 test beams was loaded (i.e. force 'F' in FIG. 2C increased) until it broke. The fracture stress on the surface was calculated according to the formula given above. The test data were then fit with a two parameter Weibull distribution function. The Weibull fit provides a characteristic strength, $\sigma_0$, defined as the stress at which 63.2% of the test specimens fail, and the Weibull modulus, m, which describes the scatter in the distribution, with lower values of m corresponding to greater scatter. Weibull fits were obtained for the set of 50 beams with polished surfaces and for the set of 50 beams with etched surfaces.

Figure 3:
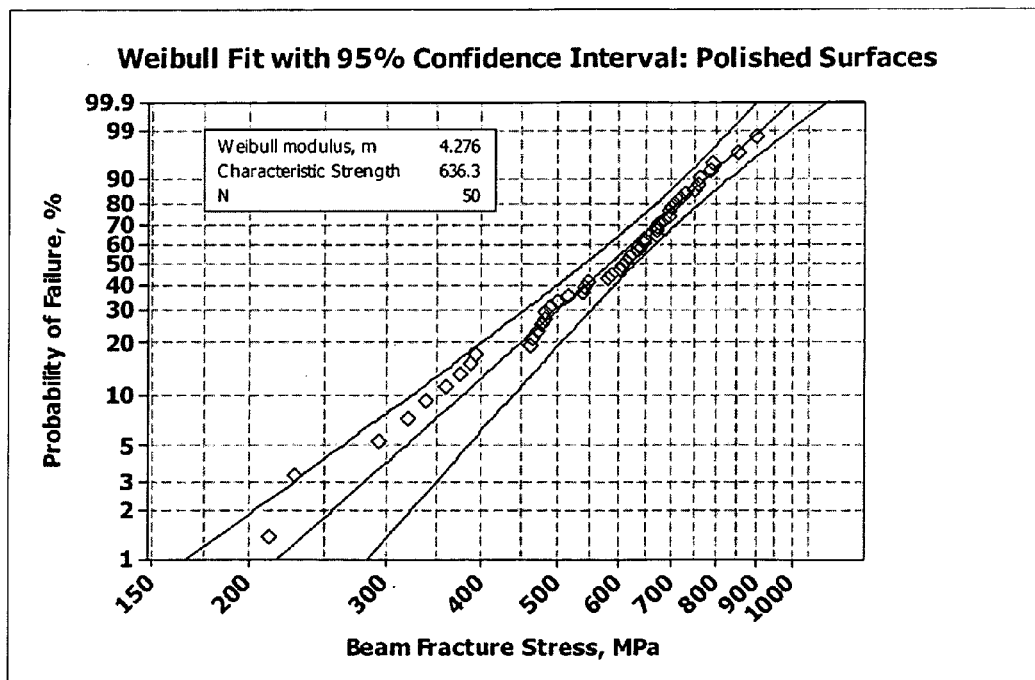
FIG. 3 is a probability plot of fracture stress data for test beams with a polished surface under stress.

FIG. 3 is a probability plot of fracture stress data for test beams with a polished surface under stress. The beam shape and size were those described in connection with FIG. 2. In FIG. 3, the characteristic strength, $\sigma_0$, is 636.3 MPa and the Weibull modulus, m, is 4.276. The reference area, $A_0$, is $1.2 \times 10^6$ μm². A Weibull fit with 95% confidence intervals is shown with the data.

Figure 4:
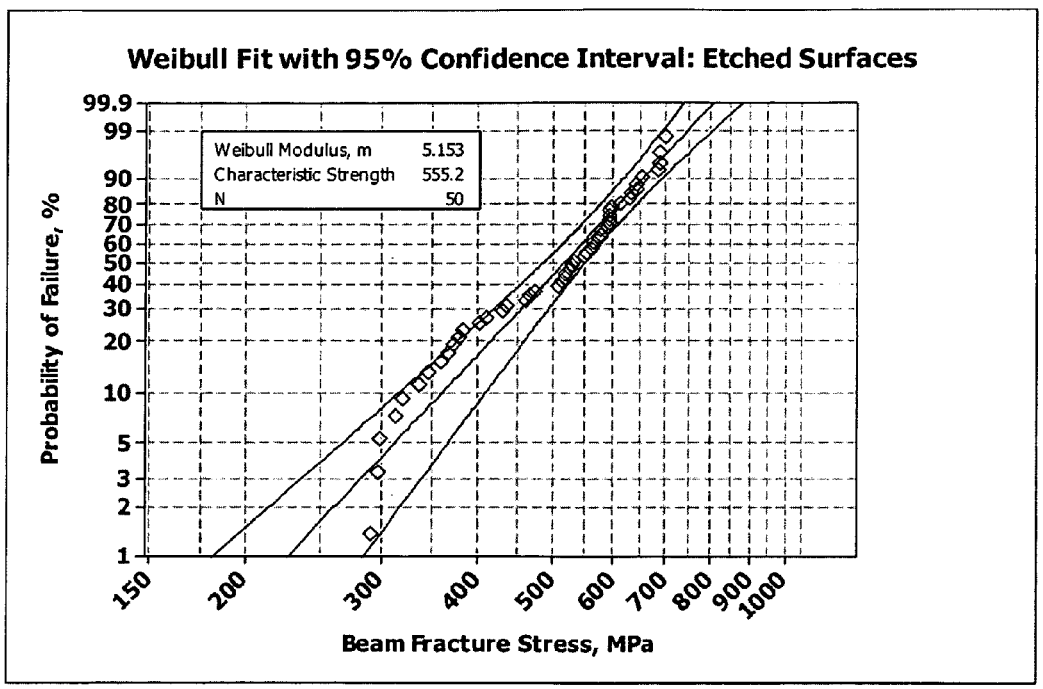
FIG. 4 is a probability plot of fracture stress data for test beams with an etched surface under stress.

FIG. 4 is a probability plot of fracture stress data for test beams with an etched surface under stress. The beam shape and size were those described in connection with FIG. 2. In FIG. 4, the characteristic strength, $\sigma_0$, is 555.2 MPa and the Weibull modulus, m, is 5.153. The reference area, $A_0$, is $1.24 \times 10^6$ μm². A Weibull fit with 95% confidence intervals is shown with the data. The characteristic strength of the etched surface is less than that of the polished surface indicating that surface flaws left by the etch process weaken the surface. The etch process used in this example was deep reactive ion etching performed in a Multiplex ICP etcher from Surface Technology Systems.

The data shown in FIGS. 3 and 4, and the Weibull parameters extracted from it, are fracture stress distribution data specific to microfabrication processes of polishing and etching, respectively. The next step in a method to predict failures in crystalline microstructures is using numerical simulation to calculate principal stresses at nodes on the surface of a device under load.

FIGS. 5A and 5B show schematic views of MEMS micro mirror 505. The mirror was used as an exemplary crystalline microstructure in an experiment. FIG. 5A shows a top view of the mirror while FIG. 5B is a sectional view as indicated in FIG. 5A. The mirror is fabricated by etching a silicon wafer; the wafer lies in the plane of FIG. 5A and perpendicular to the plane of FIG. 5B. Parts of mirror 505 include frame 506, movable mirror paddle 507, and hinge 508. (The entire mirror is one, continuous piece of silicon.) Two experimental loading points labeled "1" and "2" are shown on the paddle part of mirror 505. These points show where force is applied to the mirror during testing to check the accuracy of a failure prediction method. When force is applied (normal to the plane of FIG. 5A) at point "1", the hinge parts 508 of mirror 505 are stressed in tension. Alternatively, when force is applied at point "2", the hinges are stressed in torsion. Said another way, pushing on the mirror at point "1" or "2" stretches or twists the mirror hinges, respectively. Pushing too hard breaks the hinge.

Empty areas in FIG. 5A, such as the empty area called out by reference numeral 509, are areas where the silicon wafer substrate has been etched all the way through. FIG. 5B shows a sectional view of the mirror along the section line indicated in FIG. 5A. In FIG. 5B cross-sections 510 are internal to the bulk silicon of mirror 505. Cross-section 515, however, coincides with the etched sidewall surface of mirror paddle part 507. The fracture strength of an etched surface, such as surface 515, is different from the strength of a polished surface such as the surface of mirror 505 that is parallel to the plane of FIG. 5A.

Figure 5:
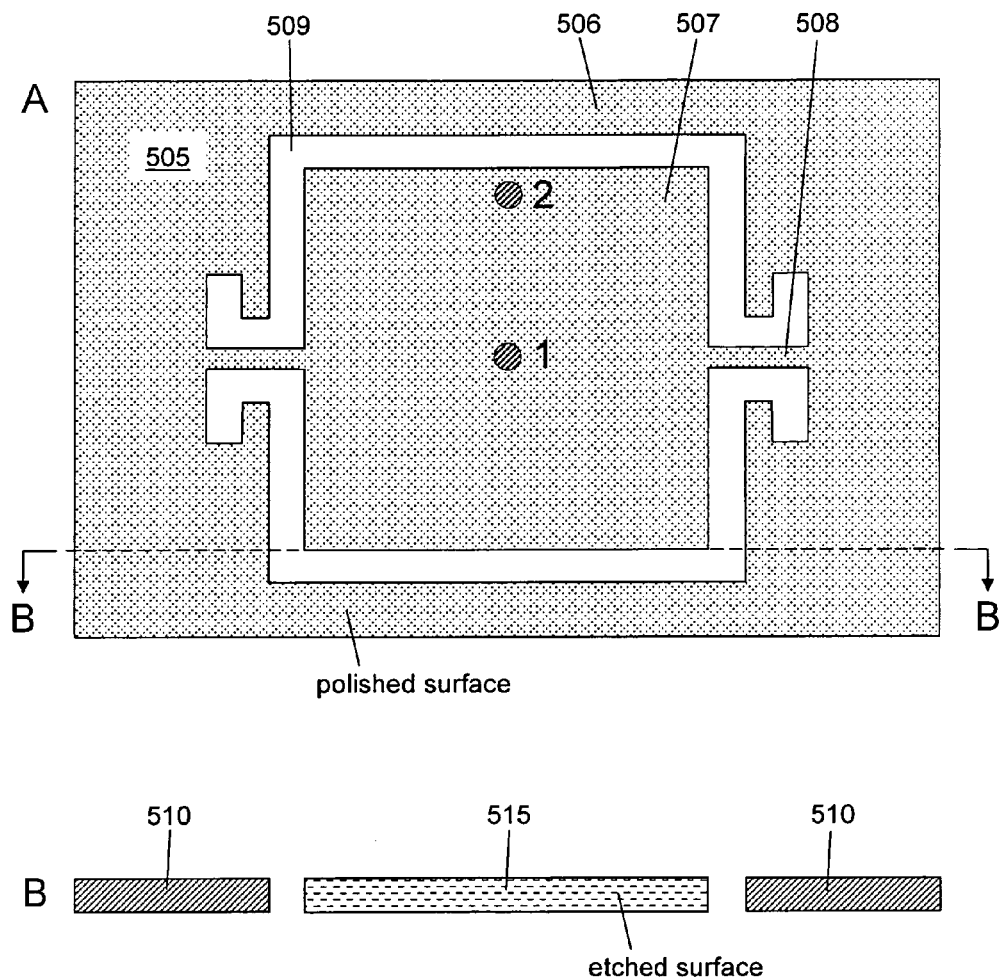
FIG. 5 (A, B) shows a MEMS micro mirror.
Figure 6:
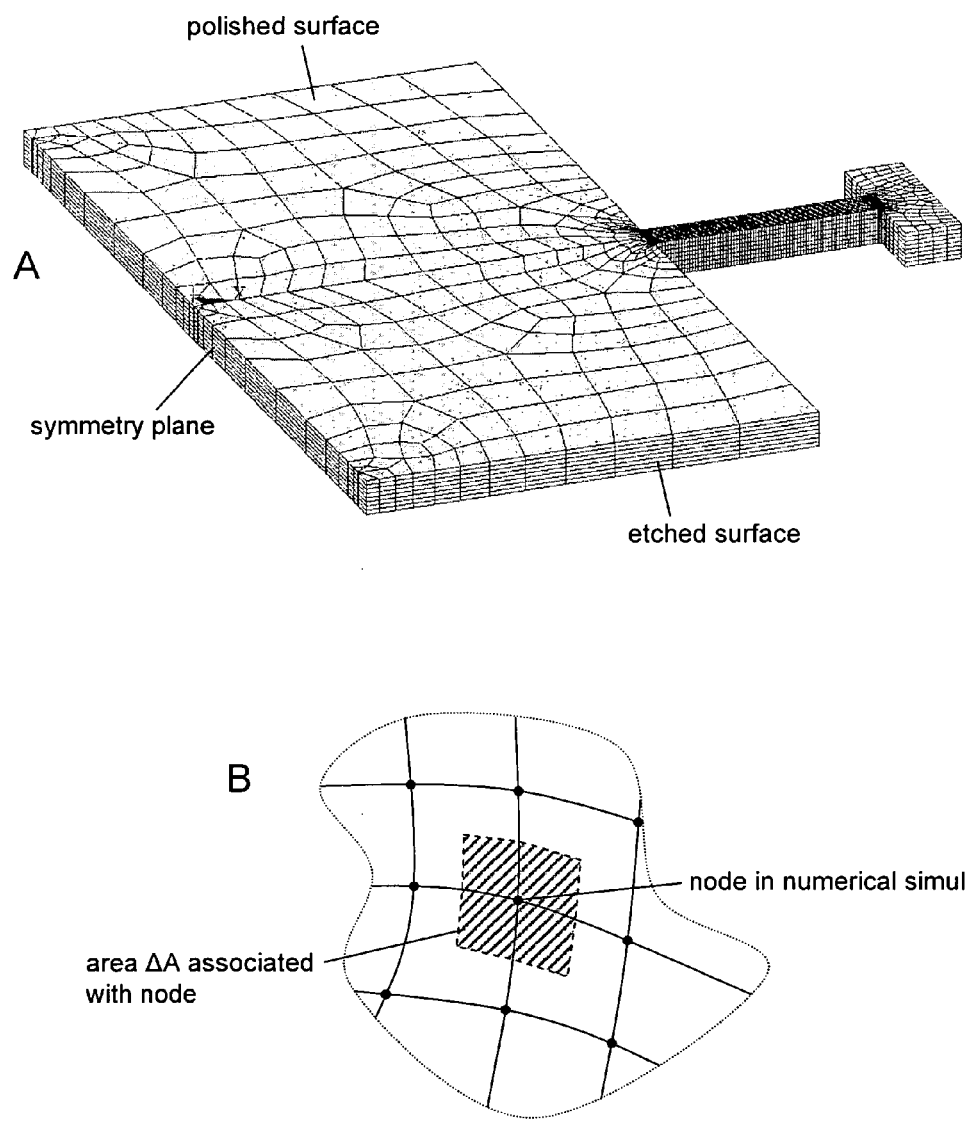
FIG. 6 (A, B) shows a finite element model of a micro mirror.

FIGS. 6A and 6B shows a finite element model of a micro mirror. FIG. 6A shows a finite element representation of half of the paddle part and one hinge from a mirror like that shown in FIG. 5A. Modeling half of the mirror is sufficient based on symmetry considerations and a plane of symmetry is labeled in the figure. The half mirror has both polished and etched surfaces as indicated in the figure. Finite element modeling involves performing calculations at representative points in a structure rather than finding a continuous solution at every point. The points where calculations are performed are called nodes and are shown as intersections of lines (indicating the interfaces between elements) on the surface of the half mirror in FIG. 6A. FIG. 6B shows a small section of a surface in a finite element simulation. Nodes are represented as dots at the intersection of lines on the surface. Also shown in FIG. 6B is an area, ΔA, associated with a node. Area, ΔA, for any node is roughly that enclosed by the perpendicular bisectors of lines connecting the node to its nearest neighbors. Those skilled in the art will recognize FIG. 6B as a simplified example of a system using eight-node hexahedron elements with linear shape functions.

A numerical model is used to calculate the principal stresses at nodes on the surface of a device under load. Depending on the material from which the device is made, fully anisotropic material properties may be modeled. For silicon, orthotropic material properties are defined for the bulk crystal from which a device is fabricated. However, in cases where solution speed is critical, such as parametric design optimization, isotropic material properties may be used. In silicon, making the assumption that material properties are isotropic leads to errors in the calculated stress distribution of approximately 3% or less.

Conventional finite element modeling practice or other numerical techniques may be used to calculate the stress distribution in a device with a load applied. (In simple cases a closed form solution may be available.) For example, a model could be run separately for loads applied at points "1" and "2" in FIG. 5A. A numerical solution is used to estimate first, second and third principal stresses ($S_1$, $S_2$, $S_3$) for each surface node of the device. Compressive stresses are ignored according to standard practice in the reliability analysis of brittle materials. Therefore, tensile principal stresses ($\hat{S}_1, \hat{S}_2, \hat{S}_3$) are defined as equal to the corresponding principal stress if the stress is greater than or equal to zero, and zero otherwise.

Calculations of the tensile stresses at surface nodes are now combined with characteristics of different types of surfaces obtained from test specimens. Let us define ntype as the number of different surface types associated with a particular device to be analyzed. For example, if a device has only polished silicon surfaces and etched silicon surfaces, created by a single type of etch, then ntype=2. The analysis of such a device requires ntype sets of Weibull parameters $\sigma_0$, m, and $A_0$. These sets of parameters are differentiated by subscript k: $\sigma_{0k}$, $m_k$, and $A_{0k}$.

Next, let us define narea as the number of areas on the surface of the device associated with a particular surface type. The surface of the device may be subdivided into as many areas as surface types or into more areas as needed for computational convenience. Finally, the number of nodes on a single surface area is defined as nnode. The value of nnode for a given surface area depends on the size of the area and the density of the numerical mesh.

The scalar probability of failure per unit area, $\Psi_i$, at each surface node on a surface of type k is then given by:

$$\psi_i = \frac{1}{A_{0k}}\left[\left(\frac{\hat{S}_1}{\sigma_{0k}}\right)^{m_k} + \left(\frac{\hat{S}_2}{\sigma_{0k}}\right)^{m_k} + \left(\frac{\hat{S}_3}{\sigma_{0k}}\right)^{m_k}\right].$$

The use of an isotropic failure probability function is justified in silicon because the fracture toughness does not vary much with crystal axis orientation. Anisotropic failure probability functions may be required for other materials. The scalar failure probability at each surface node is then given by:

$$f_i = \psi_i \Delta A_i$$

where $\Delta A_i$ associated with a node is illustrated schematically in FIG. 6B (and the Einstein summation convention has not been employed). The total reliability for the device under a given load is then estimated according to:

$$R(A) = \exp\left[-\int_A \psi dA\right] \approx \exp\left[-\sum_{k=1}^{ntype}\left[\sum_{j=1}^{narea}\left[\sum_{i=1}^{nnode} \psi_i \Delta A_i\right]_j\right]_k\right].$$

Here, integrating the reliability over the surface of a device is approximated by summing over surface nodes. The total reliability is given by the product of the reliabilities for each surface of each type. (Note: $e^{a+b}=e^a e^b$.) The corresponding probability of failure is given by: $P_s=1-R(A)$.

The result of these calculations is the probability of failure of a device under a certain load. In order to test the accuracy of this method of estimating failure probability, failure predictions for an actual MEMS device were compared to data obtained by loading many copies of an actual device to failure; i.e. by breaking them.

Silicon micro mirrors were fabricated according to the design shown in FIG. 5. The mirror paddle part 507 dimensions were 8 mm by 8 mm while the hinge parts 508 were 2 mm long and 300 μm wide. The entire structure was 310 μm thick. Twenty mirrors were loaded in the center (i.e. at point "1" in FIG. 5) to create tensile stress in the mirror hinge parts, and eighteen mirrors were loaded at the edge (i.e. at point "2" in FIG. 5) to create torsional stress in the mirror hinge parts. The mirrors were loaded to failure and the load at the breaking point was recorded. The results of these destructive tests were then compared to predicted failure probabilities derived as described above.

Figure 7:
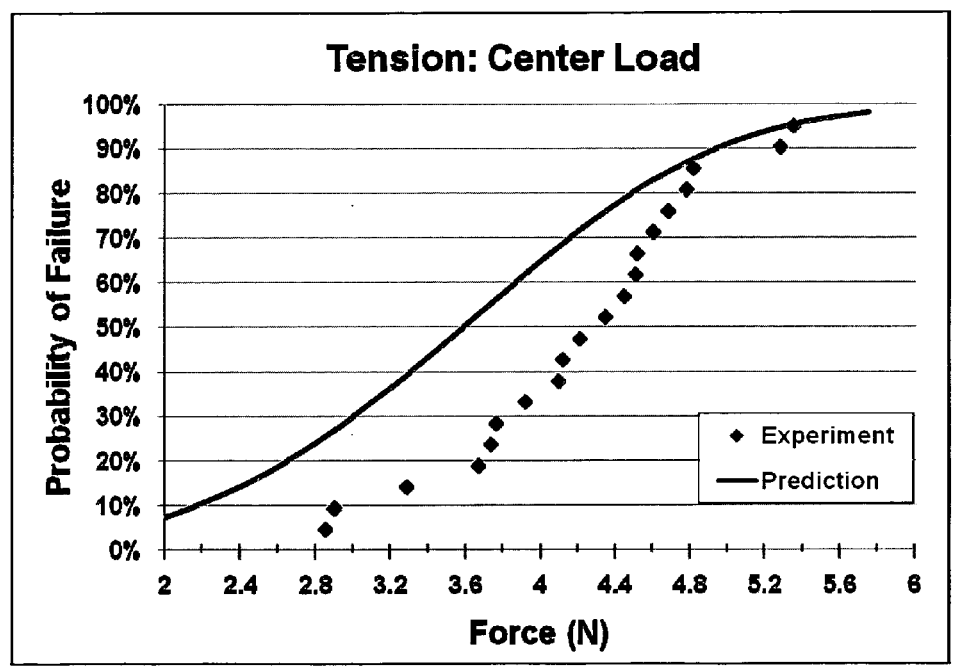
FIG. 7 is a graph of failure probability versus load for a micro mirror under tensile loading.

FIG. 7 is a graph of failure probability versus load for a micro mirror under tensile loading. In the graph, experimental data points are plotted as small diamonds while the predicted failure probability is plotted as a solid line. It can be seen in the graph that agreement between predicted and experimental results, while not perfect, is quite close. Consider, for example, the characteristic load which is defined as the load at which the probability of failure is 63.2%. The difference between the predicted and experimental characteristic load is −12%.

Figure 8:
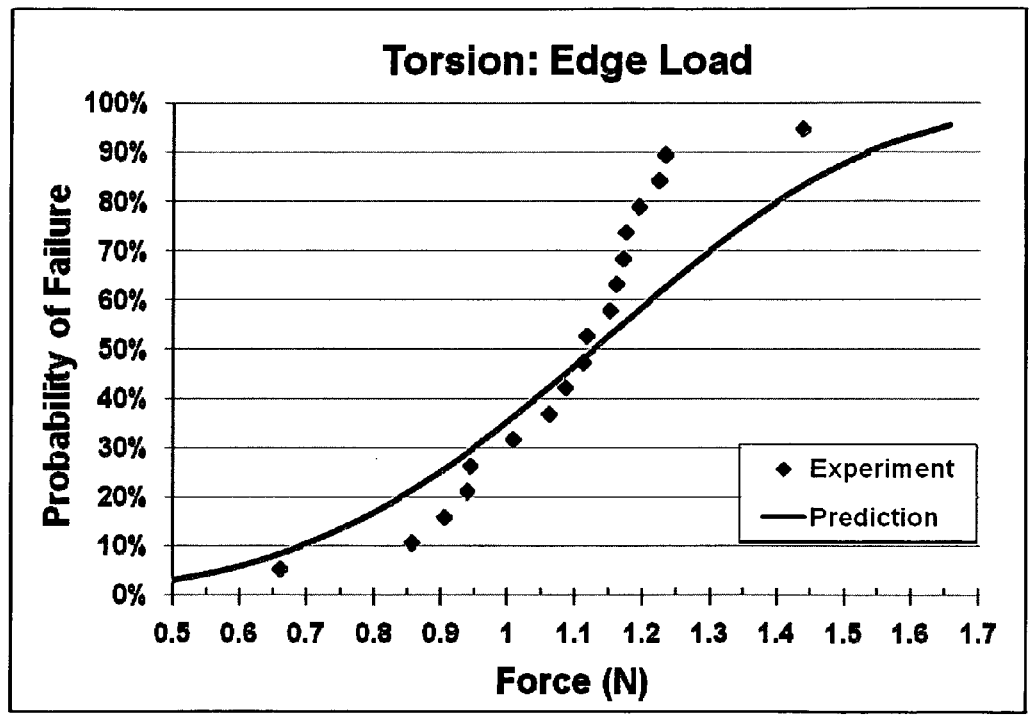
FIG. 8 is a graph of failure probability versus load for a micro mirror under torsional loading.

FIG. 8 is a graph of failure probability versus load for a micro mirror under torsional loading. In the graph experimental data points are plotted as small diamonds while the predicted failure probability is plotted as a solid line. It can be seen in the graph that agreement between predicted and experimental results, while not perfect, is quite close. The difference between the predicted and experimental characteristic load is 7%.

The method for predicting fractures in crystalline microstructures so far described may be applied to any structure in which flaws affecting the structure's strength are located on a surface rather than in the volume of the material from which the structure is made. This condition may apply to any micromachined structure made from a single crystal material. Although the method has been described in terms of an example application to MEMS structures, it is equally applicable to integrated circuits, semiconductor lasers, solar cells, or other structures made from a crystalline material.

Examples of materials available in single crystal form that are used in MEMS and other microstructures, and that are amenable to the method for predicting failures described herein include: silicon, germanium, and silicon germanium; quartz, silicon carbide, diamond, graphite, and sapphire; gallium arsenide, indium phosphide, indium gallium phosphide, indium gallium arsenide phosphide, and other so called "III-V" compound semiconductors; cadmium selenide, cadmium telluride, and other so called "II-VI" compound semiconductors. Lithium niobate, potassium dihydrogen phosphate and other electro-optic materials are also amenable to the method.

Test specimens used to gather data on probability of failure versus fracture stress may be four-point bend beams, three-point bend beams, cantilevers, rings, pull tabs or other shapes. Maximum stresses in four-point bend beams can be calculated in closed form, but that is not a requirement for test specimens. When closed form solutions for stresses in test beams are not available, numerical methods such as finite element analysis may be used.

Statistical distribution functions used to fit data obtained from a population of test specimens may be two-parameter Weibull distributions, three-parameter distributions, or other statistical distribution functions.

The origin of stresses developed in either test specimens or actual devices, or both, may be structural (i.e. the result of an applied mechanical force), thermal, electrical, magnetic, fluidic, chemical. Thermal stresses are induced by heating or cooling a device while electrical or magnetic stresses are induced by applying electric or magnetic fields to the device. Fluidic stresses result from pressure applied to a structure by a fluid. Chemical stresses result from chemical reactions acting on a device. Furthermore, combinations or superpositions of these and other stresses, such as those derived from coupled or multiphysics processes may be modeled. Forces and stresses may be time varying and dynamic, and include impulsive shocks. Repetitive forces may induce resonances and resonant enhancement of stress in a structure.

The method described herein may be extended by removing isotropy assumptions in calculations of stresses and/or failure probability. Furthermore, while the example described in detail above involved two different manufacturing processes (polishing and etching), the method is applicable to any number of manufacturing processes. Similar etches performed by different etch tools or using different settings of a single tool may be considered different manufacturing processes.

When closed form solutions for stresses are not available, calculations in the method described herein may be implemented as modules (e.g. libraries, programs, scripts) in numerical analysis packages (such as ANSYS, ABAQUS, NASTRAN/PATRAN, COMSOL, FEAP, ALGOR, etc.) or as modules written in general programming languages (such as C, Verilog, SystemVerilog, FORTRAN, MATLAB, Mathematica, etc.).

Modules can also be designed to import or export fracture stress distribution data that describe the surface condition resulting from use of a particular process recipe (e.g. control parameters), on a specific processing tool, to fabricate the microstructure. For example, for deep reactive ion etch, data corresponding to recipes for process tools made by STS, Alcatel, Plasmatherm, Centura, Lam or other manufacturers may be included. These modules can be used to add microstructure failure prediction to the capabilities of CAD programs such as those sold by Tanner EDA, Coventor, Intellisense, Cadence, Mentor Graphics and others.

Calculations in the method herein described may be implemented as a computer program that offers output in many forms. Described so far are plots of probability of failure versus applied load. Other forms of output include: plots (optionally including confidence intervals) of safe maximum service stress for a prescribed survival rate; contour plots over the surface of a device of the reliability estimate for a given applied load; contour plots combining stress and reliability data; device reliability as a function of input design parameters; and device reliability as a function of input loading. Examples of output generated by the method are given in FIGS. 9-12.

Figure 9:
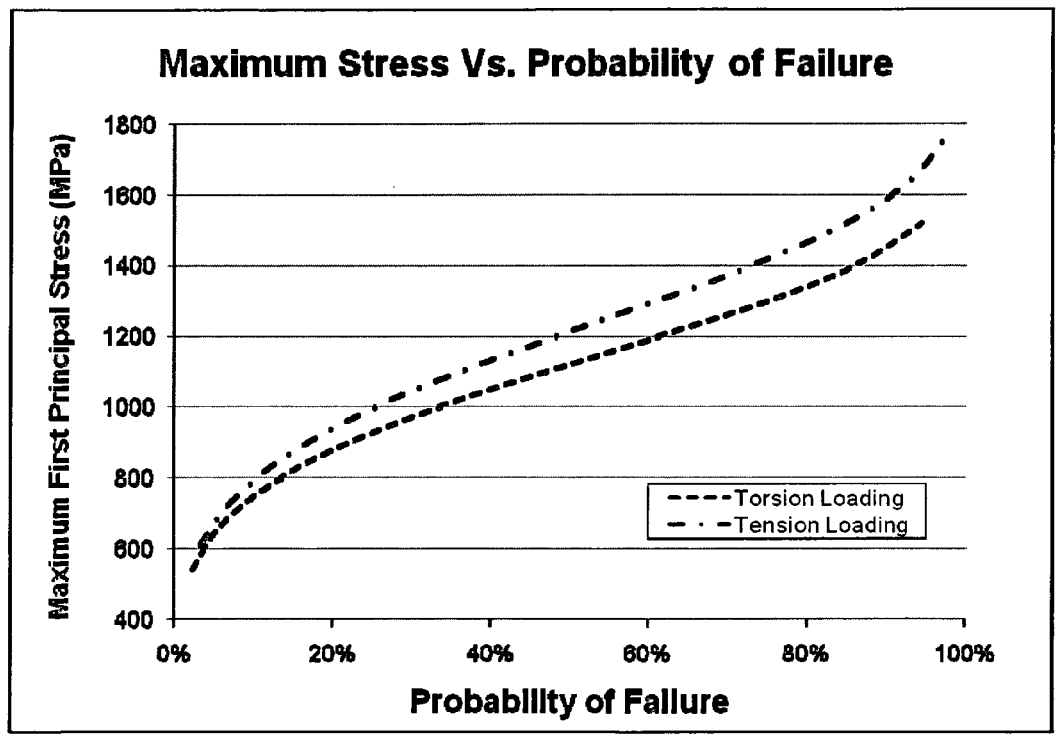
FIG. 9 shows a plot of safe maximum service stress for a prescribed probability of failure under torsion and tension loading conditions for a MEMS device.
Figure 10:
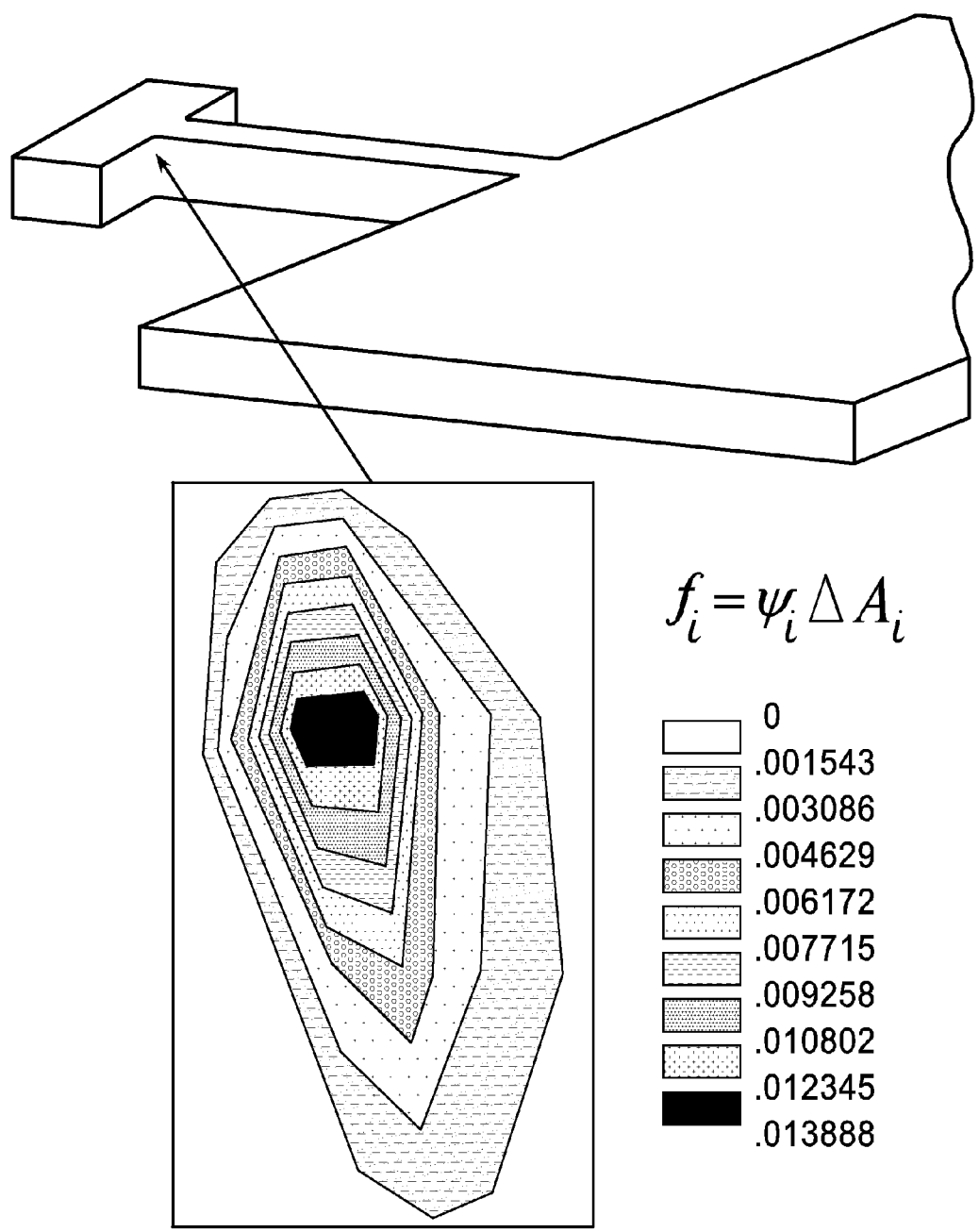
FIG. 10 shows a contour plot of the scalar failure probability on the surface of a MEMS device for a given applied load.
Figure 11:
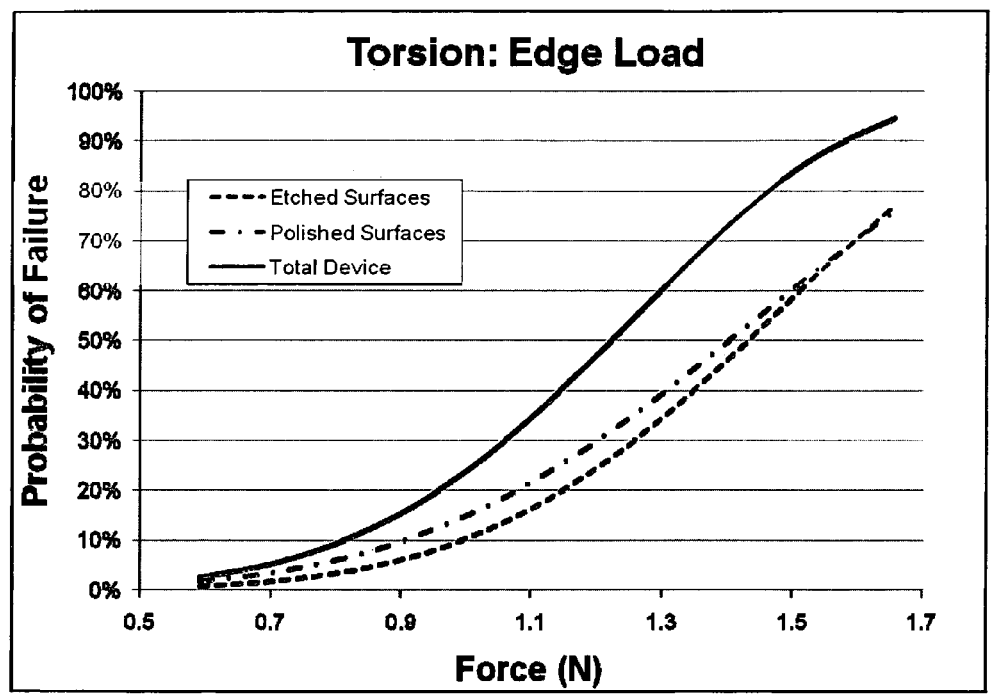
FIG. 11 is a plot illustrating the probability of failure versus applied force for a MEMS device under torsion loading.
Figure 12:
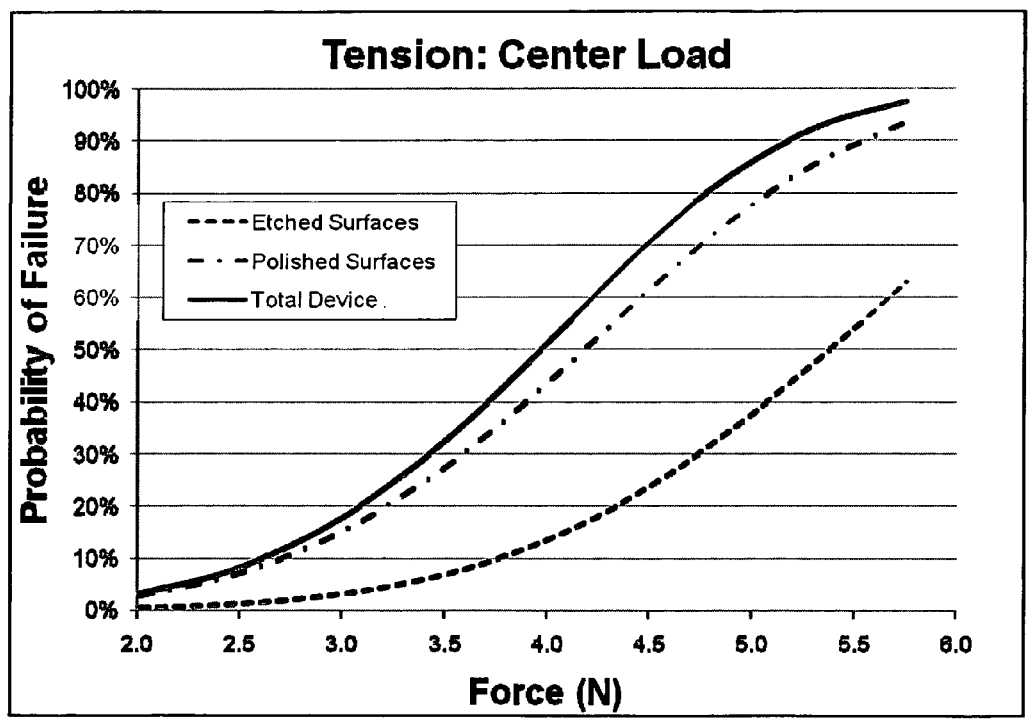
FIG. 12 is a plot illustrating the probability of failure versus applied force for a MEMS device under tension loading.

For example, FIG. 9 shows a plot of safe maximum service stress for a prescribed probability of failure under torsion and tension loading conditions for a MEMS device. Here, the maximum service stress is the first principal stress in MPa. FIG. 10 shows a contour plot of the scalar failure probability, $f_i = \psi_i \Delta A_i$, on the surface of a MEMS device for a given applied load. Plots of this type help to quantify critical locations in a device design. FIG. 11 is a plot illustrating the probability of failure versus applied force for a MEMS device under torsion loading. Contributions to the total probability of failure from failures of etched and polished surfaces are shown along with the total probability. FIG. 12 is a plot illustrating the probability of failure versus applied force for a MEMS device under tension loading. Contributions to the total probability of failure from failures of etched and polished surfaces are shown along with the total probability. Plots similar to those shown in FIGS. 11 and 12 may be generated to show the probability of failure versus displacement of a moving part instead of applied force.

Furthermore, software may include the ability to automatically detect which surfaces in a MEMS device are prepared by which manufacturing processes (e.g. specific etch processes) and to suggest design changes to improve device reliability. All computer programs or software may be supplied on computer readable media.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A method for predicting fractures in a crystalline microstructure comprising:
   preparing a set of test specimens according to a microfabrication process used to create the microstructure;
   obtaining fracture stress distribution data specific to the microfabrication process by loading the test specimens to failure;
   using numerical simulation to calculate principal stresses at nodes on the surfaces of the microstructure under a load; and,
   calculating the failure probability per unit area, $\psi_i$, at each node, i, on each different type of surface of the microstructure,
   where $\psi_i$ is a function of the fracture stress distribution data and of the principal stresses.

2. The method of claim 1 further comprising:
   for each surface, j, of each type, calculating the reliability, $R_j$, for that surface by summing over nodes on the surface according to $R_j = [\exp[-\Sigma \psi_i \Delta A_i]]_j$, where $\Delta A_i$ is the area associated with node i; and,
   calculating the total probability of failure, P, of the microstructure from one minus the product of the reliabilities of each surface according to $P = 1 - \Pi R_j$.

3. The method of claim 1 wherein the microstructure and the test specimens are made of a single crystal material.

4. The method of claim 3 wherein the material is silicon.

5. The method of claim 3 wherein the material is chosen from the group: quartz, silicon carbide, diamond, graphite or sapphire.

6. The method of claim 3 wherein the material is chosen from the group: germanium, gallium arsenide, indium phosphide, indium gallium phosphide, indium gallium arsenide phosphide.

7. The method of claim 3 wherein the material is a II-VI compound semiconductor.

8. The method of claim 1 wherein the test specimens are four-point bend beams.

9. The method of claim 1 wherein the test specimens are three-point bend beams.

10. The method of claim 1 wherein the test specimens are cantilever beams.

11. The method of claim 1 wherein the fracture stress distribution data are characterized by a two-parameter Weibull fit.

12. The method of claim 1 wherein the fracture stress distribution data are characterized by a three-parameter Weibull fit.

13. The method of claim 1 wherein the load is structural.

14. The method of claim 1 wherein the load is thermal.

15. The method of claim 1 wherein the load is electrical.

16. The method of claim 1 wherein the load is magnetic.

17. The method of claim 1 wherein the load is fluidic.

18. The method of claim 1 wherein the load is chemical.

19. The method of claim 1 wherein the load is the result of coupled loads or multiphysics processes.

20. A non-transitory computer-readable medium having instructions stored thereon, that when executed cause a method for calculating fracture probabilities for a crystalline microstructure to be performed, the method comprising:
   calculating the failure probability per unit area, $\psi$, at nodes defined on each different type of surface of the microstructure, where,
   $\psi$ is a function of: fracture stress distribution data for a microfabrication process used to create the microstructure, and of: principal stresses at the node when the microstructure is under a load;
   for each surface of each type, calculating the reliability of that surface by summing over nodes on the surface:
   $R_j = [\exp[-\Sigma \psi_i \Delta A_i]]_j$ where $\Delta A_i$ is the area associated with node i; and,
   calculating the total probability of failure of the microstructure from one minus the product of the reliabilities of each surface: $P = 1 - \Pi R_j$.

* * * * *